Patented Apr. 1, 1952

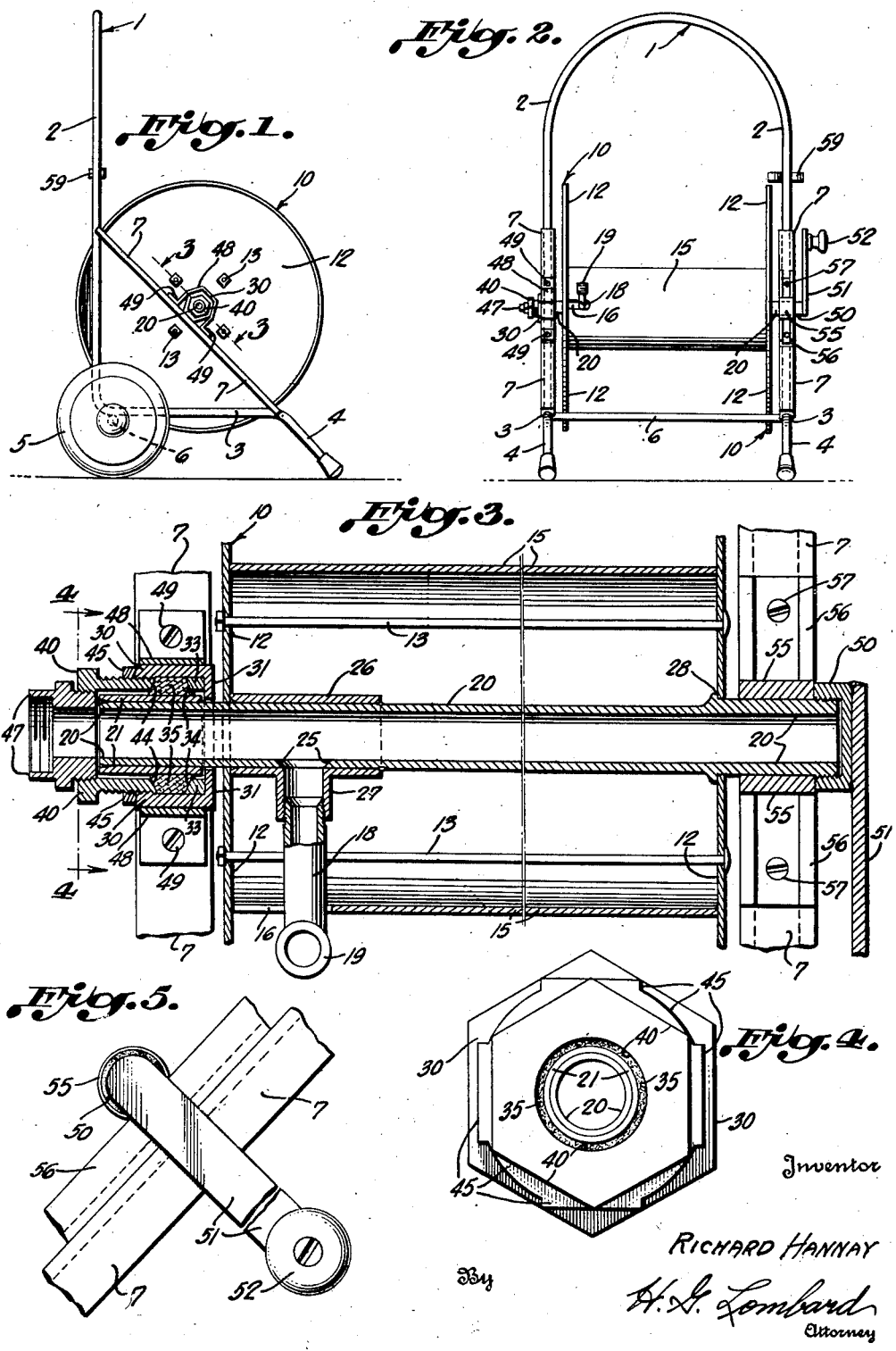

2,590,963

UNITED STATES PATENT OFFICE 2,590,963

HOSE REEL CONSTRUCTION

Richard Hannay, Westerlo, N. Y., assignor to Clifford B. Hannay & Son, Inc., Westerlo, N. Y., a corporation of New York Original application June 16, 1948, Serial No. 33,260, now Patent No. 2,506,830, dated May 9, 1950. Divided and this application February 2, 1950, Serial No. 141,893

4 Claims. (Cl. 242—87.)

This invention relates, in general, to hose reels for garden use, and the like, and deals, more particularly, with garden hose reels of the kind which provide a connection from a source of fluid to a hose that remains attached to the reel and may be wound on or unwound from the reel, as desired, without disconnection from the source of fluid. The present application is a division of prior copending application Serial Number 33,260, filed June 16, 1948, and since issued as United States Patent Number 2,506,830, dated May 9, 1950.

A primary object of the invention is to provide a strong, lightweight, unitary garden hose reel construction which comprises an improved one-piece tubular frame structure and supporting struts or braces which serve both to reinforce the frame and provide a mounting for the hose reel on the frame.

Further objects and advantages of the invention and other new and useful features in the construction, arrangement and general combination of parts will be readily apparent as the following description proceeds with reference to the accompanying drawings, for purposes of illustration but not of limitation, in which like reference characters designate like parts throughout, and in which:

Fig. 1 is a side elevational view of a garden hose reel unit in accordance with the invention;

Fig. 2 is a front elevational view of the garden hose reel unit as seen from the right of Fig. 1;

Fig. 3 is a sectional view of Fig. 1 taken along line 3—3, looking in the direction of the arrows, showing in detail the improved packing joint construction in accordance with the invention;

Fig. 4 is an end view of the packing joint as seen along line 4—4 of Fig. 3, looking in the direction of the arrows: and, Fig. 5 is an enlarged fragmentary close-up view of the mounting of the handle for rotating the hose reel as seen from the right of Fig. 2.

Referring now, more particularly, to the drawings, the invention is disclosed, by way of illustration, as embodied in a portable type of garden hose reel unit. It is to be understood, however, that the invention is not limited to this specific type of hose reel apparatus but rather, is equally adaptable to a wide range and variety of other applications and uses in similar or related types of fluid dispensing apparatus for any liquid such as oil, gasoline or water. Likewise, the improved packing joint of the invention is one of general utility and may be employed for providing a fluid tight or air tight joint in any connection of a rotary shaft or pipe for passing air, gases or fluids of any nature. Accordingly, the term "fluids" as used in this description is intended to refer to all types of liquids and gases such as oil, water and air.

The garden hose reel unit shown comprises a frame 1 that is provided preferably in a one-piece construction by a suitable length of rod or tubular pipe material which is bent intermediate its ends to define a generally U-shaped handle portion comprising side arms 2, and base portions 3 bent angularly in generally normal relation to said side arms 2. Preferably said base portions 3 terminate in downwardly inclined feet 4 supporting the frame above the ground at one end of the base in conjunction with wheels 5 supporting the other end thereof. The wheels 5 are mounted on a transverse shaft 6 which is welded or otherwise secured to the base portions 3 adjacent their junctions to the side arms 2. Accordingly, when stationary, the hose reel unit assumes the position shown in Fig. 1 and may be moved simply by grasping the U-shaped handle and tilting the frame rearwardly on the wheels 5 as necessary to clear the feet 4 from the ground, whereupon the unit may be moved on said wheels 5 to any desired location, as may be readily understood.

On each side of the frame 1, a diagonally extending brace or strut 7 is secured at its ends to the side arm 2 and the associated horizontally extending base portion 3 to reinforce and support the same against distortion or deformation from their proper position in the frame structure. The struts or braces 7 are strong channel-shaped bars or rods which are welded or otherwise secured at their ends to the side arms 2 and base portions 3, respectively, and preferably in substantial alignment with the downwardly inclined feet 4 to provide a balanced, symmetrical design of pleasing appearance. The braces 7, accordingly, define at their approximate middle portions flat, sturdy supporting surfaces on which the projecting ends of the hose reel shaft are firmly and rigidly secured to mount the hose reel in the frame in a compact, unitary construction, as presently to be described.

The hose reel, designated generally 10, comprises preferably a pair of circular spaced discs or flanges 12 on either side of a central drum 15 in the form of a sheet metal cylinder suitably secured between said discs 12 by rods 13, Fig. 3. The drum is provided with a cutout opening 16, Figs. 2 and 3, through which there extends an L-shaped elbow 18 or the like, which is connected at its inner end in communication with the fluid passage through the packing joint, as hereinafter disclosed. The hose (not shown) is connected to the outlet end 19 of said elbow 18 outwardly of the drum 15 and from this point is coiled around said drum between the discs 12 in the usual manner.

As shown in Fig. 3, the improved packing joint comprises a relatively small, compact construction at one side of the reel which serves both as a support for the adjacent side of the reel on the associated brace 7, and as a fluid tight connection for passing fluid through the tubular shaft 20 to the outlet pipe 18 within the drum 15. The tubular shaft 20 extends horizontally through the hose reel drum 15 and through shaft openings in the side flanges or discs 12 to support the hose reel in the complete unit. Said shaft 20, accordingly, is of such length as to provide end portions projecting from the sides of said discs 12 for mounting the hose reel on the braces 7 of the frame of the unit. The tubular shaft 20 is provided with an opening 25 within the drum 15 and in association therewith a T-shaped connector or coupling 26 is telescoped over said shaft and welded thereto with the shank 27 of said connector aligned with said opening 25 in the tubular shaft and threadedly connected to the outlet pipe 18. Preferably the outer end of said T-shaped connector 26 is disposed adjacent the adjoining disc 12 to define an abutment supporting said disc against lateral forces in the complete reel structure. A similar abutment is provided by an enlargement 28 on said shaft for supporting the disc 12 at the opposite side of the reel.

The outer end of the tubular shaft 20 associated with the packing joint is provided with a collar, ferrule or hub 21 which is telescoped over the end of said shaft and welded, soldered or otherwise secured thereto. The packing joint comprises an enlarged cap nut 30 having an inwardly extending flange 31. The cap nut is first applied to the shaft and the collar or hub 21 then welded to the shaft, as aforesaid, in a manner whereby said collar defines an abutment which is engageable with said inturned flange 31, on the cap nut to retain said cap nut against disassembly from the shaft. The collar 21 otherwise serves as a shaft reinforcing bushing against which the packing 35 in the joint may be clamped with increased force to provide a most efficient leakproof joint. The cap nut 30 defines a housing or bearing for the packing joint and within this housing there is disposed adjacent the inturned cap or flange 31 a clamping ring 33 having an inwardly bevelled face 34 adjacent the packing 35. The packing 35 is provided preferably in the form of woven, round packing rope impregnated with oil resistant material and arranged in closely packed convolutions around the collar 21.

On the opposite side of the packing 35, a packing gland 40 in the form of a threaded sleeve or the like is threaded into the cap nut 30. The inner end of said packing gland 40 is provided with an inwardly bevelled clamping face 44 in oppositely inclined relation to the bevelled clamping face 34 on the clamping ring 33. A lock nut 45 preferably is provided on the gland 40 for locking the same in any position of threaded engagement with the cap nut 30. The gland 40 otherwise may be of any suitable type and in the present example is shown provided with internal threads receiving a threaded fitting 47 for connecting a feed pipe or hose to the apparatus from the source of fluid.

Accordingly, it will be understood that upon tightening the packing gland 40 within the cap nut 30, the oppositely inclined bevelled faces 34, 44, on the packing ring 33 and on the packing gland 40, respectively, compress the packing against the reinforcing collar 21 on the shaft with any desired force. By virtue of the bevelled formation of the faces 34, 44, in oppositely inclined relation, said faces compress the opposite sides of the packing with equal and even force in a manner to cause the packing 35 to bulge outwardly against the collar or hub 21 and thereby support it and the shaft 20 with constant uniform clearance from the adjacent structure of the clamping ring 33 and packing gland 40. Thus, only the packing 35 is in contact with the collar or hub 21 to support the associated shaft 20 in a fluid tight joint while otherwise permitting rotation of said shaft without danger of damaging metal to metal contact with the adjacent packing ring 33 and packing gland 40. This clearance between the hub 21 and adjacent bearing structure ensures rotation of the shaft 20 in what may be termed a floating bearing support of the shaft on the packing 35. Such clearance is ample to compensate for and absorb a limited amount of distortion in the hose reel 10 without causing objectional metal to metal contact of the collar or hub 21 with the adjacent clamping ring 33 and packing gland 40, as aforesaid. The described clearance mounting of the shaft 20 is maintained constant and uniform, and the complete packing joint retained as tight as desired by tightening of the packing gland 40 within the cap nut 30 whenever necessary. The cap nut 30 otherwise defines a rigid housing which may be easily mounted on the adjacent brace 7 of the frame in any suitable manner as by means of a strap 48 embracing said cap nut 30 and secured at its ends to the brace 7 by bolts 49.

The end of the tubular shaft 20 opposite the packing joint is closed in any suitable manner as by a cap plug 50 threaded thereon in a fixed connection. A crank 51 having a suitable handle 52 is welded or otherwise united to said plug 50 so that operation of said crank 51 turns the shaft 20 to rotate the hose reel for winding or unwinding the hose therefrom. A bearing 55 supports this end of the shaft 20 on the associated brace 7. The bearing 55 may be of any suitable type in the form of a yoke, or the like, embracing the end of the shaft and united, as by welding or other means, to a bracket 56 which in turn is secured as by bolts 57 to the associated brace or strut 7.

From the foregoing, it will be understood that a hose reel construction embodying a packing joint in accordance with the invention is readily fabricated in a minimum of time and assembling operations to provide the tubular shaft 20 in the described floating mounting in the housing defined by the cap nut 30 and cooperating packing gland 40. The shaft 20, accordingly, is arranged for rotation within the cap nut housing 30 yet is rigidly supported by said cap nut on the brace 7 of the frame of the apparatus.

The shaft 20 thus provides a mounting for the associated end of the hose reel 10, and otherwise serves as a passage for the fluid which enters the same through the inlet fitting 47 connected to the source of the fluid. The fluid passes through the tubular shaft 20 where the closure or cap plug 50 forces the fluid through the shaft opening 25, the shank 27 of the T-shaped connector, and through the elbow 18 to the hose (not shown) which is connected to the outlet end 19 of said elbow. The hose as thus connected to the outlet 19 is coiled around the drum 15 between the side flanges or discs 12 in the customary manner. Accordingly, for any dispensing operation, the hose is adapted to be pulled and thereby unwound from the drum 15 for any desired length during which the inner end of the hose remains connected to the elbow 18 and rotates along therewith and the hose reel drum 15 as permitted by the aforesaid rotatable mounting of the tubular shaft 20. When the desired length of hose has been drawn from the drum, the fluid dispensing operation may be commenced without further preparation inasmuch as the hose is already connected to the source of fluid through the elbow 18, the T-shaped connector 26 and the tubular shaft 20, as described. Rewinding of the hose on the reel is easily and quickly effected by turning the crank 51 which revolves the shaft 20 and rotates the drum 15 in the direction for rewinding the hose thereon. When the hose is fully rewound on the drum, the free end thereof is secured by a clasp type clip 59 which holds the hose in fully rewound position and prevents any unintended rotation of the reel 10 in the direction for unwinding the hose therefrom.

The various parts of the packing joint preferably are fabricated from either malleable iron or brass castings, and the dimensions of which are selected according to load and service requirements and the predetermined size and design of any particular hose reel construction. Accordingly, while the invention has been described in detail with a specific example, such example is intended as an illustration only, inasmuch as it will be apparent that other modifications in the construction, arrangement and general combination of parts may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning, and range of equivalency of the claims intended to be embraced therein.

What is claimed and desired to be secured by United States Letters Patent is:

1. In a reel apparatus, a frame comprising a one-piece length of metal bent into a generally U-shaped formation to provide a pair of spaced arms and integral base portions extending angularly from said spaced arms in the same general direction, a rigid substantially straight rod brace at each side of said frame extending diagonally between each arm and its associated base portion and secured thereto to hold said arm and base portion in rigid relation to each other, and a reel comprising a shaft having its ends projecting from the sides of said reel and supported in bearings on said rigid rod braces of the frame.

2. Apparatus of the class described comprising a one-piece length of metal bent into a generally U-shaped formation to provide a pair of spaced arms and integral base portions extending angularly from said spaced arms in the same general direction and provided with downwardly extending supporting feet, wheels supporting said base portions in cooperation with said supporting feet, a rigid substantially straight brace at each side of said frame extending diagonally between each arm and its associated base portion and secured thereto to hold said arm and base portion in rigid relation to each other, and a reel provided with shaft portions projecting from the sides of said reel and mounted on said diagonally extending rigid braces.

3. Apparatus of the class described comprising a frame provided by a one-piece length of metal bent into a generally U-shaped formation to define a pair of substantially vertical spaced arms and having bends defining integral base portions extending substantially horizontally from said spaced arms in the same general direction and provided with downwardly extending supporting feet, wheels adjacent said bends in said vertical spaced arms supporting said base portions in cooperation with said supporting feet, a rigid substantially straight brace at each side of said frame extending diagonally between each arm and its associated base portion with the ends of said brace welded thereto to hold said arm and base portion in rigid relation to each other, a reel provided with shaft portions projecting from the sides of said reel, and means securing said projecting shaft portions to said diagonally extending rigid braces.

4. In a hose reel apparatus, a frame comprising a one-piece length of metal bent into a generally U-shaped formation to provide a pair of spaced arms and integral base portions extending angularly from said spaced arms in the same general direction, a rigid substantially straight brace at each side of said frame extending diagonally between each arm and its associated base portion and secured thereto to hold said arm and base portion in rigid relation to each other, and a hose reel comprising a tubular shaft having its ends projecting from the sides of said reel and supported on said rigid braces of the frame, a nut on one of said shaft ends providing a bearing therefor, and means securing said nut to the associated brace of the frame.

RICHARD HANNAY.

REFERENCES CITED

The following references are of record in the file of this patent:

UNITED STATES PATENTS

| Number | Name | Date |
|---|---|---|
| 872,469 | Snell | Dec. 3, 1907 |
| 966,625 | Trope | Aug. 9, 1910 |
| 1,450,006 | More | Mar. 27, 1923 |
| 1,637,523 | Hamilton | Aug. 2, 1927 |
| 1,817,892 | Claus | Aug. 4, 1931 |
| 2,045,336 | Skoglund | June 23, 1936 |
| 2,490,353 | Hannay | Dec. 6, 1949 |

FOREIGN PATENTS

| Number | Country | Date |
|---|---|---|
| 17,524 | Great Britain | July 24, 1914 |